United States Patent Office 3,455,659
Patented July 15, 1969

3,455,659
SUPERHEATING AMMONIA
James Edgar Longfield, Stamford, and Lindley Clair Beegle, Darien, Conn., assignors to American Cyanamid Company, Stamford, Conn., a corporation of Maine
No Drawing. Continuation-in-part of application Ser. No. 393,768, Sept. 1, 1964. This application Sept. 6, 1967, Ser. No. 665,735
Int. Cl. B01j *1/20;* F28f *21/00*
U.S. Cl. 23—293    1 Claim

ABSTRACT OF THE DISCLOSURE

Gaseous ammonia is superheated to 550° C. to 750° C. in a preheating zone prior to passing to a reactor. Cracking of the ammonia in the preheat zone into nitrogen and hydrogen is minimized by employing an alloy material for the preheat zone surface of either nickel-chromium alloys or nickel-chromium-molybdenum alloys which contain at least 55% nickel and 14% chromium in combination with the ammonia containing either 0.05% to 0.2% by weight water or 0.005% to 0.01% by weight carbon dioxide or mixtures of both.

---

This application is a continuation-in-part of application Ser. No. 393,768 filed Sept. 1, 1964, now abandoned.

The present invention relates to the preparation of melamine. More particularly, the instant discovery concerns the production of melamine by contacting urea at substantially atmospheric pressure with a bed of inert, inorganic, heat-stable, highly porous absorbent solids of high surface area at a temperature in the range of 300° C. to 450° C., preferably 350° C. to 400° C. Still more particularly, the present invention involves supplying the major portion of the heat to said bed by passing therethrough superheated ammonia, the ammonia gas acting as a source of heat, a sweeping gas and, if desired, a fluidizing gas.

Obviously, heating a bed of solids and maintaining a reaction zone of the type contemplated herein at temperatures in the range of 300° C. to 450° C. can be a fairly expensive process when using conventional means, such as heating jackets about the reactor zone, heat exchange tubes in the bed, etc.

Pursuant to the present invention, ammonia is preheated to a temperature in the range of 550° C. to 750° C. in a heating zone having an interior surface of nickel-chromium alloy or nickel-chromium-molybdenum alloy. Typical of such alloys are Inconel and Hastelloy C. Surprisingly, only a minor amount of ammonia cracking is experienced at these high temperatures and the alloys are extremely durable, as will be seen hereinafter.

It is readily apparent to the person skilled in this art that significant ammonia cracking and/or surface deterioration negate any advantage the use of preheated ammonia might have as a source of heat in a catalytic process for producing melamine. Increased impurities in the off-gases from the melamine reactor, or frequent shutdowns to replace or repair the ammonia preheated lining, or both, would render preheating impractical.

According to the instant discovery, however, ammonia superheated to 550° C. to 750° C. while in contact with Inconel or Hastelloy C, for example, is thereafter passed through a bed of inert, inorganic, heat-stable, absorbent solids containing urea and the reaction endotherm is supplied without the necessity for costly heating jackets, heat exchange tubes, or the like.

It has been found further, pursuant to the present invention, that the addition of very small but effective amounts of $H_2O$ and $CO_2$ to the ammonia inhibits ammonia cracking in the preheater still more. For example, ammonia cracking is reduced by better than 10%, for long periods of time, using an Inconel inner surface in the preheater and adding from about 0.05% to 0.2% (mole percent) $H_2O$ and/or from about 0.005% to 0.01% (mole percent) $CO_2$ to the ammonia.

This phenomenon is not fully understood but its advantages are indeed substantial when operating a reactor for extended periods of time. Other metals and alloys show some reduction in ammonia-cracking when $H_2O$ and/or $CO_2$ are added to the ammonia but, unlike the nickel-base alloys of the instant discovery, this benefit is short-lived. Severe attack and deterioration of the surfaces in contact with the ammonia-$CO_2$-$H_2O$ mixture is soon experienced; this added to the severe deterioration encountered in the absence of the $CO_2$ and/or $H_2O$ eliminates these other metal or alloy surfaces as preheater surfaces.

Ammonia gas so preheated is best transferred directly to the bed of catalyst particulates. For this purpose, therefore, the reaction zone may be adjacent the ammonia preheating zone. Should one desire to separate these zones and conduct the preheated $NH_3$ to the reaction zone through one or more conduits, these conduits may themselves be made from Inconel or Hastelloy C or at least lined interiorly with these alloys. Likewise, the preheater zone itself may be merely lined with these alloys, using other metals, alloys or ceramics for backing.

According to a preferred embodiment of the present invention, a bank of parallel Inconel or Hastelloy C tubes is established in a closed gas-fired furnace and ammonia introduced into one end and removed from the other end of each tube. The tubes may be electrically heated, if desired. Likewise, $H_2O$ and/or $CO_2$ may be added to the ammonia in any convenient manner, such as just prior to feeding the ammonia to the heating tubes. These tubes may vary in diameter up to 4 to 6 inches or even larger and may be as long as forty feet or more. The person skilled in the art will readily realize that the present invention is concerned with the preheater surfaces in contact with the ammonia being preheated more so than the overall type and size of the preheater.

Inconel has the following composition: Ni, 78.5%; Cr, 14.0%; Fe, 6.5%; the balance being only minor amounts of other metals. Hastelloy C has the following composition: Cr, 14.5–16.5%; Fe, 4.0–7.0%; Mo, 15.0–17.0%; Co, 2.50%; the balance being essentially Ni, and only minor amounts of other metals. While these are preferred nickel-chromium and nickel-chromium-molybdenum alloys, other essentially similar alloys may be employed herein.

The present invention will best be understood, from the following example:

In an electric tube furnace 7 feet long, vertically-disposed, and having a 6-inch internal diameter are placed four separate ¼-inch diameter tubes, one end of each tube set in a manifold placed about three feet from the bottom of the furnace, the other end of each tube passing upwardly and out the top of the furnace. The manifold is a round disc 5¾ inches in diameter, 1¾ inches thick, and made of Hastelloy C. A ½-inch Hastelloy C tube entering the furnace upwardly through the bottom thereof enters the center of the manifold and communicates with the lower terminal end of each of the four separate ¼-inch tubes as follows: two holes are bored through the long dimension of the disc, the borings being on lines which intersect at the center of the disc, and the resulting four open ends plugged; a hole is then bored upwardly through the bottom of the disc to the point where it communicates with the long dimension borings, and four separate holes are bored downwardly through the manifold disc, yet off-center, to the point where each hole communicates with a separate boring extending radially from the center of disc to its corresponding plug. A ¼-inch diameter tube is fitted into each of the four openings in the top of the disc and the ½-inch diameter Hastelloy C tube entering the bottom of the furnace is fitted into the opening in the bottom of the disc, thus placing the ½-inch tube in communication with each of the ¼-inch tubes through the network of conduits in the manifold itself.

Superimposed on the furnace is a quenching zone consisting of a 6-inch internal diameter tank in which cold water is circulated, the upper portion of each of the four ¼-inch tubes passing through this zone and thus being immersed in water.

Each ¼-inch tube is made of different material: one is Inconel, one is Hastelloy C, one is copper-lined (ca. 0.03-inch thick lining) stainless steel and one is Vycor glass. Ammonia gas preheated to 485° C. is fed into the bottom of the furnace through the ½-inch tubing and into the manifold where it passes to each of the ¼-inch tubes and is heated to 700° C., the flow rate through each of the ¼-inch tubes is about ⅛ pound mole per hour. The ammonia gas contains about 10 percent $H_2$ and the furnace is run for slightly over 4000 hours at about 35 pounds per square inch absolute pressure. Upon passing from the top of the furnace at 700° C. and into the quenching zone, where it is cooled to about 30° C., the ammonia emanating from each tube is periodically analyzed for percent cracking with the following results:

TABLE 1

[Cracking rate (lbs./hr./ft.$^2$)]

| Material | After 600 hours | At 4,000th hour |
|---|---|---|
| Inconel | 0.90 | 1.40 |
| Hastelloy C | 0.34 | 0.62 |
| Copper | 0.008 | 0.024 |

TABLE 2

| Material | Percent $H_2O$ added after 4,000 hours | Percent $CO_2$ added after 4,000 hours | Cracking rate (lbs./hr./ft.$^2$) |
|---|---|---|---|
| Inconel | 0.08 | 0.008 | 1.25 |
| Hastelloy C | 0.08 | 0.008 | 0.28 |

TABLE 3

| Material | Percent $H_2O$ alone added between 1,800–2,000 hours | Percent $CO_2$ alone added between 1,800–2,000 hours | Cracking rate (lbs./hr./ft.$^2$), change From— | To— |
|---|---|---|---|---|
| Inconel | 0.2 | | 1.0 | 0.92 |
| Hastelloy C | 0.2 | | 0.43 | 0.21 |
| Inconel | | 0.005 | 1.0 | 0.96 |
| Hastelloy C | | 0.005 | 0.43 | 0.28 |

Water and $CO_2$ are added prior to superheating to 550° C. to 750° C., preferably prior to reaching 200° C. From 2 to 10% hydrogen diluent is present in the ammonia for ease of analyzing and also to inhibit cracking. The ammonia gas emanating from the Vycor tube is a blank used solely for reference, thus permitting a determination of the amount of cracking across the preheater and the cracking in each tube.

As is obvious from the results in Table 1, above, the cracking rate in the copper tube is up by a factor of 3. Upon inspection of the tube its internal surface had chipped considerably and it appeared corrugated, so to speak. The Inconel and Hastelloy C tubing held up very well and the cracking rate increase was far less.

Preferably, according to the present invention, the nickel base alloy in contact with the ammonia should be at least 200 microns thick.

Obviously, the above examples are merely illustrative of the nickel-chromium and nickel-chromium-molybdenum alloys contemplated herein. Alloys having at least about 55% Ni and at least about 14% Cr are suitable. Molybdenum when present is generally present a concentration below about 18%.

Clearly, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claim.

We claim:

1. A method of superheating ammonia with a minimum of cracking which comprises preheating ammonia in a preheating zone, the interior surface of which is a material selected from the group consisting of nickel-chromium alloys and nickel-chromium-molybdenum alloys said alloys containing at least about 55% nickel and at least about 14% chromium, said ammonia containing a material of the group consisting of from 0.05% to 0.2% by weight of water, 0.005% to 0.01% by weight of carbon dioxide, and mixtures thereof in order to further minimize cracking, heating the mixture in said zone to a temperature within the range of 550° to 750° C., and feeding the resulting superheated ammonia to a reactor zone through a conduit having the same alloyed inner surface as the preheating zone.

References Cited

UNITED STATES PATENTS

| | | | |
|---|---|---|---|
| 2,575,497 | 11/1951 | Mackay et al. | 260—249.7 |
| 3,095,416 | 6/1963 | Crowley et al. | 260—249.7 |
| 3,152,128 | 10/1964 | Steggerda | 260—249.7 |
| 3,377,350 | 4/1968 | Watson et al. | |

FOREIGN PATENTS

| | | |
|---|---|---|
| 480,680 | 1/1952 | Canada. |
| 953,369 | 3/1964 | Great Britain. |
| 957,362 | 5/1964 | Great Britain. |
| 628,255 | 8/1949 | Great Britain. |
| 848,381 | 9/1960 | Great Britain. |
| 958,633 | 5/1964 | Great Britain. |

NORMAN YUDKOFF, Primary Examiner

V. W. PRETKA, Assistant Examiner

U.S. Cl. X.R.

260—249.7